UNITED STATES PATENT OFFICE.

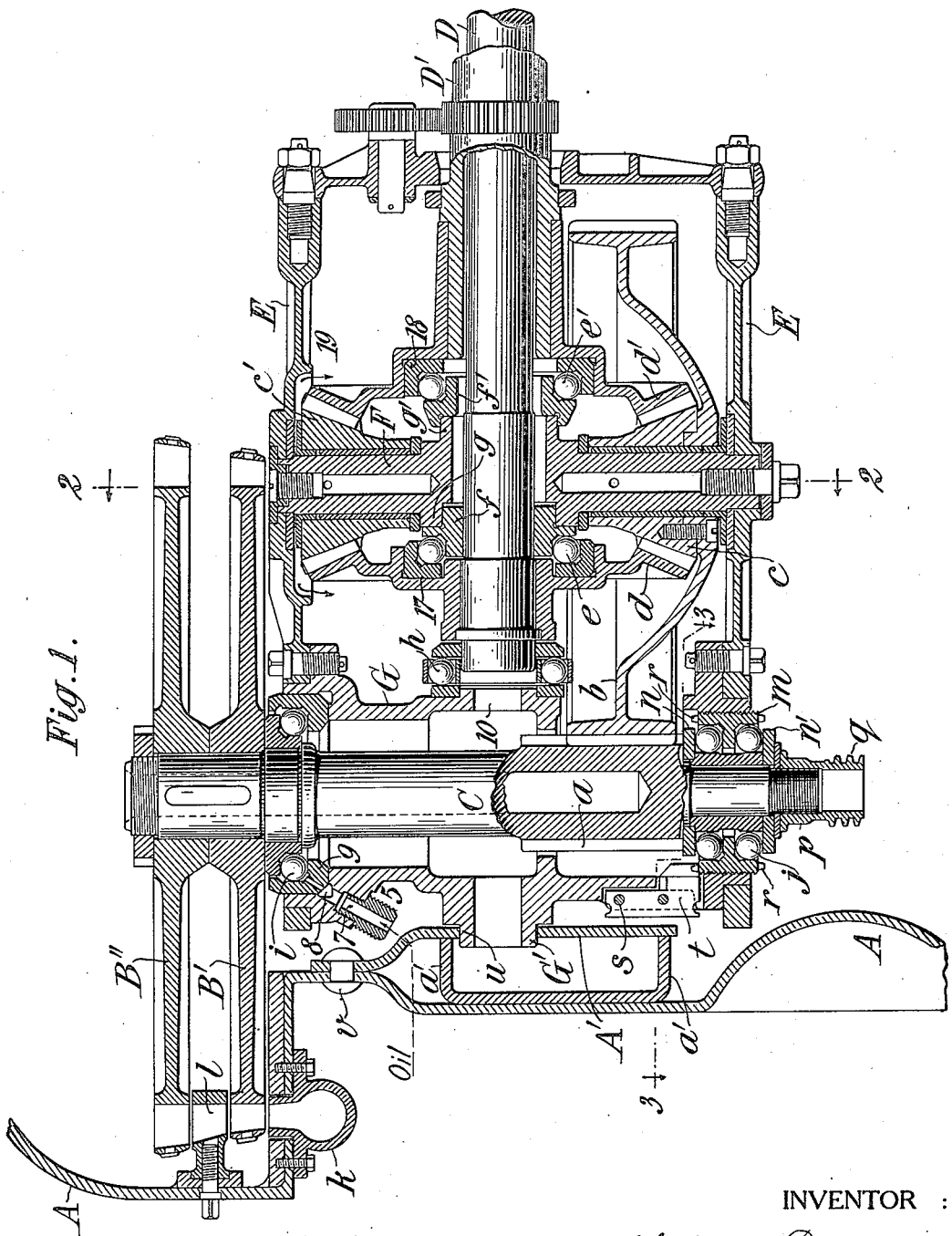

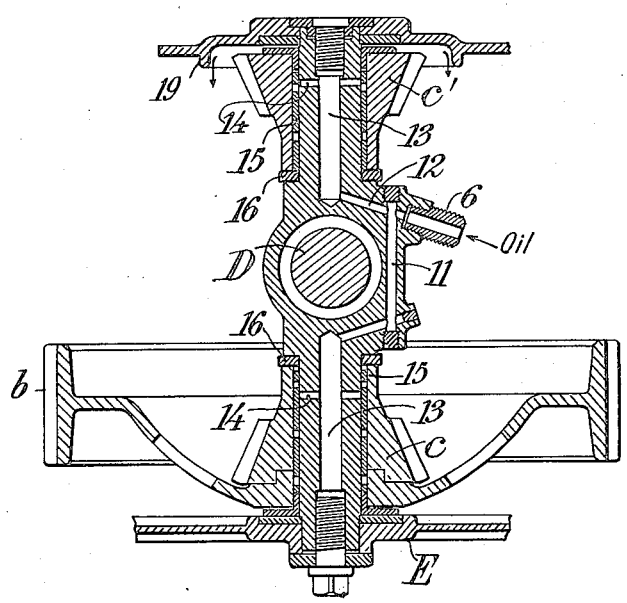
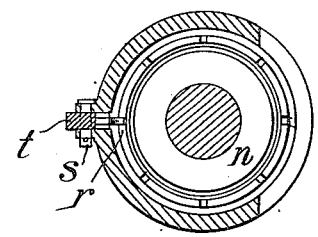
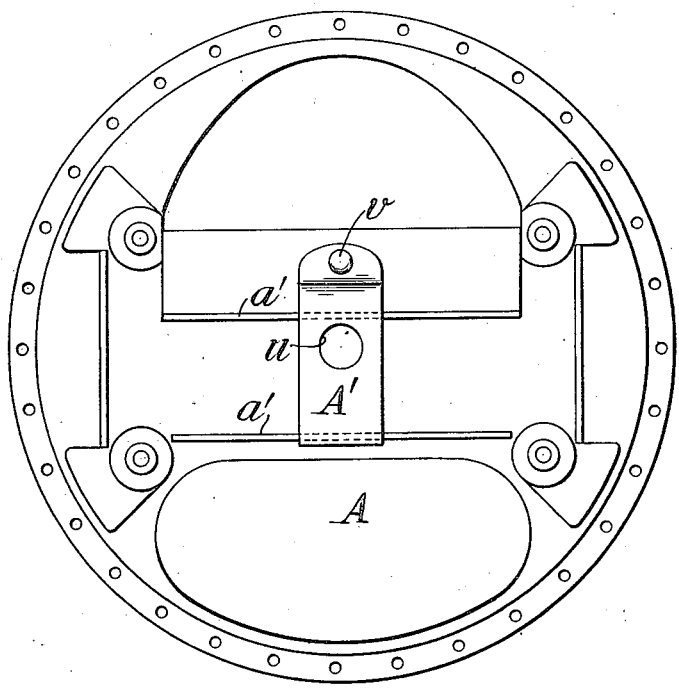

WILLIAM DIETER, OF BROOKLYN, NEW YORK.

PROPELLING MECHANISM FOR AUTOMOBILE TORPEDOES.

1,407,261.     Specification of Letters Patent.     Patented Feb. 21, 1922.

Application filed November 24, 1919. Serial No. 340,358.

*To all whom it may concern:*

Be it known that I, WILLIAM DIETER, a citizen of the United States of America, residing in the borough of Brooklyn, county of Kings, city and State of New York, have invented certain new and useful Improvements in Propelling Mechanism for Automobile Torpedoes, of which the following is a specification.

This invention relates to turbine propelling mechanism for the propulsion of automobile torpedoes.

The general type of turbine mechanism to which the present invention relates is set forth in patent to F. M. Leavitt, No. 1,088,080, dated February 24, 1914, and patent to F. C. B. Page, No. 1,155,435, dated October 5, 1915. The present invention involves certain improvements in the construction of such turbine driving mechanism directed mainly to the means for centering the propeller shaft mountings, and for receiving the propulsive thrust and communicating it to the transverse bulkhead of the torpedo, by which such thrust is transmitted to the torpedo hull.

Figure 1 of the accompanying drawings is a vertical longitudinal mid-section of the driving mechanism;

Fig. 2 is a transverse section on the line 2—2 in Fig. 1;

Fig. 3 is a horizontal transverse section on the line 3—3 in Fig. 1;

Fig. 4 is a rear elevation of the torpedo bulkhead.

Referring to the drawings, A designates the transverse bulkhead of the torpedo, which in general is of the usual known construction; B' and B'' are the primary and secondary turbine wheels; C is the turbine shaft; D and D' are the respective propeller shafts, and E is the bearing frame for said shafts and for the transmission gearing.

The shaft C carries a pinion $a$ near its lower end, which pinion meshes with a gear wheel $b$ which carries a bevel pinion $c$ either fixed to it or formed integrally with it. This pinion meshes on opposite sides with bevel gears $d\ d'$, the former being fixed on the shaft D and the latter being fixed on the shaft D', as heretofore. The gears $b\ c$ turn on a stationary vertical shaft or crosshead F made fast at both ends in the frame E, thus constituting a part of this frame. Its lower portion forms a journal or bearing for the said gears $b\ c$, and its upper portion is similarly formed as a journal or bearing for an idler bevel pinion $c'$, the sole function of which is to balance the pinion $c$ and co-operate therewith in maintaining the gears $d\ d'$, in unison in their opposite rotation. The bevel gears $d\ d'$ are mounted on ball bearings $e\ e'$ respectively, as heretofore, the stationary track rings $f\ f'$ of these bearings being supported upon suitable bosses $g\ g'$ formed on the crosshead F. The end thrust of the propeller shafts D is resisted by a ball bearing $h$.

The turbine shaft C is mounted in an upper ball bearing $i$ and a lower double ball bearing $j$, the outer stationary raceways of which are held in a tubular housing G which extends vertically between and is fastened to the frames E E and so constitutes a portion of the framework. In order that the turbine wheels may readily be adjusted vertically to bring them into correct relation with the nozzle $k$ and reversing block $l$, provision is made for adjusting either of these bearings vertically in order thereby to set the shaft C up or down. Preferably it is the lower bearing which is thus adjusted, its sleeve $m$ forming the outer ball raceways, being mounted adjustably in the frame, preferably by screwthreading it exteriorly and mounting it in a threaded opening in some part of the framework, preferably the foot of the tubular housing G. The sleeve $m$ is best made with a middle rib separating the two rows of balls constituting the ball bearing $j$, so that the respective balls are confined vertically between this rib and disk flanges $n\ n'$ which are formed or fastened on the shaft C, being preferably made separately and clamped in place by the screw sleeve $p$ which carries the usual worm $q$ which drives in the known manner the lubricating pump. To hold the sleeve $m$ in adjustment it is formed with a series of notches $r$ in either end (preferably in both ends, so that it may be inserted either side up) and a holding dog $t$ fastened to any suitable stationary part, as the housing G, by screws or pins $s$, the projection of this dog entering through an opening in the housing and engaging one of the notches $r$. The dog is applied after the parts have been brought to the required adjustment.

For properly centering the propelling mechanism within the torpedo, and for supporting part of its weight and to that extent relieving the framework E, the housing G is formed on its forward side with a boss G' in concentric alignment with the axis of the shafts D D', this boss being received in a hole $u$ formed in a hanger A' constructed preferably as a piece of steel plate loosely united to the bulkhead A by means of a rivet or similar connection $v$. This construction facilitates the lateral centering of the mechanism, and the hanger A' carries any suitable part of the weight of the mechanism. It may also assist in resisting the thrust due to the propelling stress, which is all transmitted from the shafts D D' to the framework E E G and thence to the bulkhead. Heretofore this thrust has been communicated wholly through the frames E E, where these frames engage the bulkhead in the known manner; the present construction enables any desired part of the thrust to be communicated through the boss G' to the hanger A', and thence through the flanges $a'$ of the bulkhead reinforcing plate to the bulkhead and thence to the hull of the torpedo.

For the lubrication of the propelling mechanism oil is supplied under pressure in any suitable manner. The manner customary in the Bliss-Leavitt torpedo is by means of an oil force pump driven from the worm $q$. For an understanding of such lubricating means reference is made to patent of Frank M. Leavitt, No. 1,150,777, dated August 17, 1915. The oil delivered under pressure from such a force pump, or from any other source of oil under pressure, is introduced to the propelling mechanism through inlets 5 (Fig. 1) and 6 (Fig. 2), (preferably constructed as nipples for the attachment of an oil delivery pipe). These inlets communicate with bores leading to the respective bearings.

The improved lubricating means now provided is not claimed in the present application, being claimed in a divisional application, Serial No. 357,211, filed February 9, 1920, to which reference may be made for a description of the lubrication.

An advantage of the central bearing of the frame member G upon the bulkhead A above described, is that it affords a very rigid connection between the propelling mechanism and the shell of the torpedo. Heretofore it would occasionally happen that a torpedo would be dropped or jarred in transportation, and such jar would often exert a downward strain upon the propelling mechanism; also, in above-water launching, the torpedo, when it strikes the water, encounters often a serious jar, resulting in the same downward strain. Such strains were sometimes sufficient to bend the supporting frames E E and permit the turbine to be slightly displaced downwardly, resulting occasionally in the primary wheel binding against the nozzle, or the secondary wheel against the reversing block. Such disadvantageous result is wholly avoided by the improved central suspension of this mechanism by engagement with the transverse bulkhead A, which is one of the strongest members of the torpedo.

It must not be inferred from the particularity of detail with which the preferred construction is herein shown and described, that the invention is limited to such details, it being obvious that the construction may be considerably modified without departing from the essential features of the invention which are set forth in the appended claims.

I claim as my invention:—

1. In a torpedo, the combination of a turbine, oppositely revolving propeller shafts, gearing communicating rotation from the turbine to the propeller shafts, a bearing frame for such turbine and gearing, and a transverse bulkhead having a center bearing for said frame.

2. The combination of claim 1, the bulkhead having a hanger in which such central bearing is formed, such hanger adjustable laterally to center the bearing.

3. The combination of claim 1, said bearing frame comprising a housing enclosing the turbine shaft, said housing having a boss on its forward side, and said transverse bulkhead having a bearing engagement with said boss.

4. The combination of claim 1, said bearing frame receiving the forward thrust of a propeller shaft and communicating such thrust to the bulkhead at its central engagement therewith.

5. The combination of claim 1, the bulkhead having transverse flanges, and a hanger bearing against said flanges receiving the central thrust of the bearing frame and transmitting such thrust to the bulkhead flanges.

6. In a torpedo, the combination of a turbine, a shaft to which the turbine is fast, a bearing frame having bearings for opposite end portions of said shaft, one of said bearings adjustable to vary the longitudinal position of the shaft, and means for holding such bearing in place after adjustment.

7. The combination of claim 6, the turbine shaft being vertical, its lower bearing being the adjustable one and consisting of a double ball bearing.

8. The combination of claim 6, the adjustable bearing comprising a threaded member screwing in a threaded portion of the bearing frame, and means for locking it against rotation after adjustment.

9. The combination of claim 6, the adjustable bearing comprising a threaded member screwing in a threaded portion of said bearing frame and having successive notches, and locking means therefor consisting of a holding dog fastened detachably to a stationary part and engaging one of such notches.

10. The combination of claim 6, said bearing frame comprising a housing for the turbine shaft, with a locking device for the adjustable bearing consisting of a holding dog detachably fastened in an opening in said housing, and having a projection entering the housing and engaging said adjustable bearing.

In witness whereof, I have hereunto signed my name.

WILLIAM DIETER.